United States Patent [19]

Eheim

[11] 4,094,201

[45] June 13, 1978

[54] FUEL INJECTION PUMP FOR INTERNAL COMBUSTION ENGINES

[75] Inventor: Franz Eheim, Stuttgart, Germany

[73] Assignee: Robert Bosch GmbH, Stuttgart, Germany

[21] Appl. No.: 685,652

[22] Filed: May 12, 1976

[30] Foreign Application Priority Data

May 21, 1975 Germany ............................ 2522373

[51] Int. Cl.² ........................ F02M 41/2; F02M 59/44; F16H 25/12

[52] U.S. Cl. .......................................... 74/56; 74/567; 123/139 BD; 417/500

[58] Field of Search ...... 123/139 BD, 90.51, 188 AA, 123/139 R, 139 AA, 58 A, 58 AA, 58 AB, 58 AM; 417/DIG. 1, 485, 500; 74/56, 567, 569

[56] References Cited

U.S. PATENT DOCUMENTS

| | | | |
|---|---|---|---|
| 1,470,410 | 10/1923 | Wilcox | 123/90.51 |
| 1,860,852 | 5/1932 | Coles | 75/126 B X |
| 2,055,341 | 9/1936 | Dyer | 123/90.51 |
| 3,058,455 | 10/1962 | Hofer et al. | 123/139 BD |
| 3,219,311 | 11/1965 | Siver | 123/188 AA |

*Primary Examiner*—Irwin C. Cohen
*Assistant Examiner*—Richard Gerard
*Attorney, Agent, or Firm*—Edwin E. Greigg

[57] ABSTRACT

The invention relates to a fuel injection pump for internal combustion engines provided with a reciprocating and simultaneously rotating pump piston which serves as a fuel distributor and an associated cam drive mechanism arranged to actuate the pump piston, the cam drive including a cam disk which runs on rollers and in turn is coupled both with the drive shaft of the pump and the pump piston.

4 Claims, 2 Drawing Figures

FUEL INJECTION PUMP FOR INTERNAL COMBUSTION ENGINES

BACKGROUND OF THE INVENTION

The demands made on such a cam disk vary greatly. On the one hand, the clutch member of the cam disk or ring must exhibit sufficient elasticity to withstand even jolt-like torques without causing fatigue fracture, while conversely the front cam rolling surface must be as hard and wear-resistant as possible to withstand the extraordinarily high pressure occurring between the cam surface and the rollers. The magnitude of the piston force may be selected proportionately to the wear resistance of the cam surface material, i.e., the greater the wear resistance, the greater may be the piston force, while the torque to be transmitted should be proportionate to the elasticity of the coupling assembly which is subjected to extreme bending stress, i.e. the greater the elasticity of the coupling assembly, the greater may be the torque selected for transmission.

OBJECT AND SUMMARY OF THE INVENTION

The principal object of the invention is the development of a cam disk which attains these divergent requirements to the effect that as compared to known cam-type drives, performance is substantially improved, thereby resulting especially in advantageous overall dimensions of the injection pump.

This object is attained according to the invention, by an improved design of the cam disk which comprises two parts, i.e. a support member carrying the coupling part, and a ring connected rigidly with the latter which is constructed of a harder material and on which the cams are arranged.

According to an advantageous embodiment of the invention, this concept employs the manufacture of a cam disk in which the latter consists of two specially machine-finished parts of material having a variable hardness and connected rigidly with each other, one of the parts thereof being made as a support member with the coupling parts and the second as a ring provided with cam surfaces.

In the preferred embodiment of the invention, the support member is provided with an outwardly extending flange portion, the radial extent of which overlaps at least in part the radial extension of the cam ring with the support member and cam ring being secured together by electron beam welding.

DESCRIPTION OF THE PREFERRED EMBODIMENT

Figure 1:
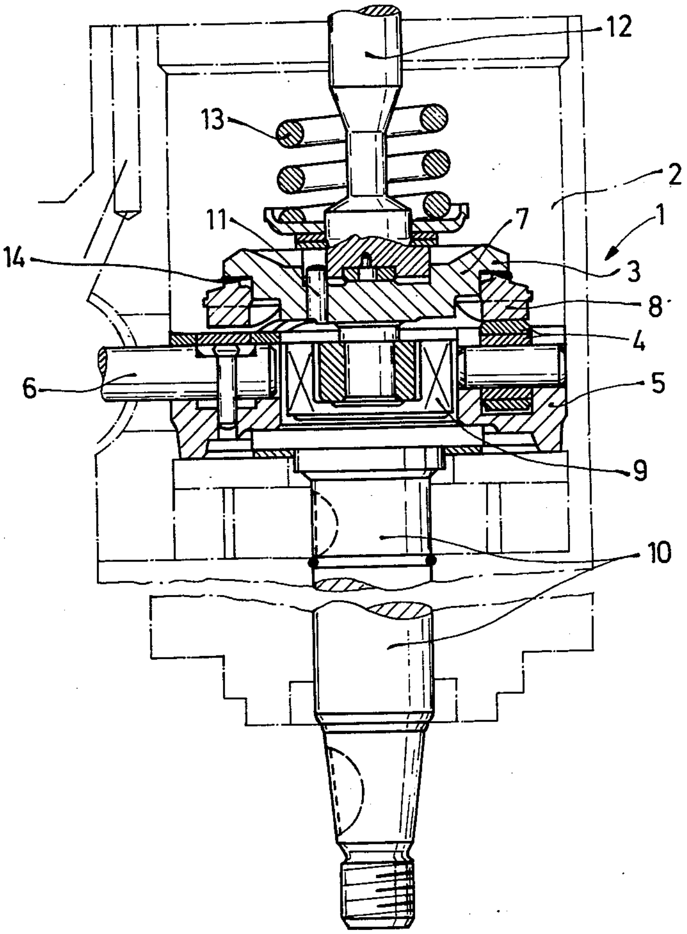
FIG. 1 is a longitudinal section through the lower portion of a fuel injection pump.

Turning now to the drawings, FIG. 1 shows in dotted outline the housing of a fuel injection pump used for multi-cylinder internal combustion engines. Rotatably mounted within the housing is a drive shaft 10 connected with an axial cam plate 7 which has as many cam lobes 8 as correspond to the number of cylinders in the engine. The axial cam plate 7 is axially reciprocated by rotation through interaction with locally fixed rollers 4, the latter being supported in the carrier element 5.

It will be observed that the roller carrier 5 is pinned to the shaft 6. The cam disk 3 comprises two members i.e., a support member 7 and a cam ring 8. As is customary in structures of this general type, the support member 7 is associated on the one hand with a coupling 9 with the drive shaft 10 and on the other hand with the pump plunger 12 by way of a pin 11.

The cam disk is urged into contact with the roller 4 by a spring 13 to thereby cause the pump plunger 12 to execute, in addition to the rotary motion induced by the coupling means 9 and 11, a reciprocal motion when the shaft 10 rotates and the cam ring 8 passes over the rollers 4.

Figure 2:
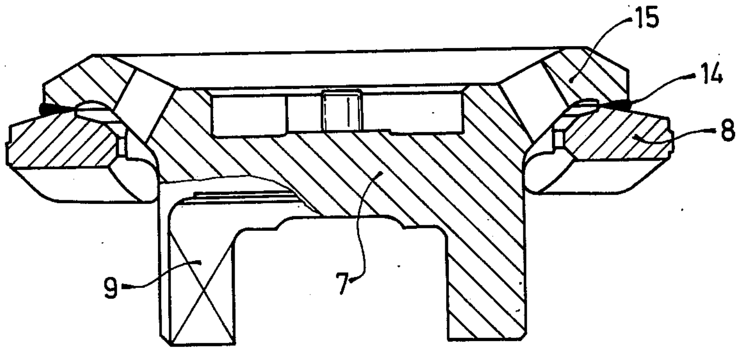
FIG. 2 is a longitudinal section in view of the cam disk in an enlarged scale.

The technical demands made on the cam ring 8 and on the support member 7 differ greatly, that is to say, that due to the torque transmission, and especially because of the coupling assembly, the support member 7 must be manufactured of an elastic material, e.g. an extrudable casehardenable material (16Mn Cr 5, i.e., an alloy comprising 16% manganese and 5% chromium) which exhibits a high degree of core toughness. In contrast thereto, the cam ring 8 should be made of a highly wear-resistant material, e.g. DMO 5 casehardened, i.e., steel used in high speed applications and also known as S652 steel, which comprises 6% tungsten, 5% Molybdenum and 2% vanadium so as to attain the greatest possible pressure between the cam surface and the roller. The support member 7 and the cam ring 8 are fused as illustrated at 14 by means of an electron beam welding method. The support member 7 overlaps the cam ring 8 by means of a flange 15 (see FIG. 2) in order to achieve first of all a favorable transmission of power, and secondly, to be able to execute the welding seam 14 in a radial direction.

What is claimed is:

1. In a fuel injection pump for an internal combustion engine, including: a rotatable drive shaft; a reciprocating and simultaneously rotating pump plunger; and a cam drive mechanism engageable with the pump plunger, said cam drive mechanism including: a two part cam disk; and roller means engageable with the cam disk for imparting to the cam disk, and pump plunger, a displacement in the reciprocating direction of the pump plunger, said two part cam disk, comprising:

- a support member manufactured of an elastic material which exhibits a high degree of core toughness, said support member having coupling means for coupling to the drive shaft, thereby producing rotation of the cam drive mechanism and the pump plunger; and
- a cam ring bonded to the support member, and manufactured of a casehardened wear-resistant material.

2. A fuel injection pump for an internal combustion engine as claimed in claim 1, in which the support member comprises an extruded casehardened material consisting of 16Mn Cr 5.

3. A fuel injection pump for an internal combustion engine as claimed in claim 1, in which the cam ring includes a radially extending flange portion that extends beyond the support member therefor.

4. A fuel injection pump for an internal combustion engine as claimed in claim 1, in which the bonding is conducted in a groove provided between the complemental surfaces of the support member and said cam ring.

* * * * *